US008635606B2

(12) United States Patent
Kruglick

(10) Patent No.: US 8,635,606 B2
(45) Date of Patent: *Jan. 21, 2014

(54) DYNAMIC OPTIMIZATION USING A RESOURCE COST REGISTRY

(75) Inventor: Ezekiel John Joseph Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 551 days.

This patent is subject to a terminal disclaimer.

(21) Appl. No.: 12/578,336

(22) Filed: Oct. 13, 2009

(65) Prior Publication Data

US 2011/0088022 A1    Apr. 14, 2011

(51) Int. Cl.
*G06F 9/45* (2006.01)

(52) U.S. Cl.
USPC ........... 717/153; 717/149; 717/150; 717/151; 717/152; 717/154; 717/155; 717/156; 717/157; 717/158; 717/159; 717/160; 717/161

(58) Field of Classification Search
None
See application file for complete search history.

(56) References Cited

U.S. PATENT DOCUMENTS

| | | | |
|---|---|---|---|
| 4,210,962 A * | 7/1980 | Marsh et al. | 705/7.11 |
| 4,916,659 A * | 4/1990 | Persoon et al. | 712/18 |
| 5,745,778 A | 4/1998 | Alfieri | |
| 5,806,059 A * | 9/1998 | Tsuchida et al. | 1/1 |
| 5,826,079 A | 10/1998 | Boland et al. | |
| 6,289,369 B1 | 9/2001 | Sundaresan | |
| 6,567,806 B1 * | 5/2003 | Tsuchida et al. | 1/1 |
| 6,658,448 B1 | 12/2003 | Stefaniak et al. | |
| 6,745,336 B1 | 6/2004 | Martonosi et al. | |
| 6,769,017 B1 | 7/2004 | Bhat et al. | |
| 6,782,410 B1 | 8/2004 | Bhagat et al. | |
| 7,143,412 B2 | 11/2006 | Koenen | |
| 7,146,607 B2 * | 12/2006 | Nair et al. | 717/151 |
| 7,363,523 B2 | 4/2008 | Kurts et al. | |
| 7,383,396 B2 | 6/2008 | Wyman | |
| 7,437,581 B2 | 10/2008 | Grochowski et al. | |

(Continued)

FOREIGN PATENT DOCUMENTS

| EP | 1736851 A2 | 12/2006 |
|---|---|---|
| JP | 08315598 | 11/1996 |

(Continued)

OTHER PUBLICATIONS

Albonesi, D., "Selective Cache Ways: On-Demand Cache Resource Allocation," Nov. 1999, Proceedings of the International Symposium on Microarchitecture, 12 pages.

(Continued)

*Primary Examiner* — Henry Tsai
*Assistant Examiner* — Jing-Yih Shyu
(74) *Attorney, Agent, or Firm* — Hope Baldauff, LLC

(57) ABSTRACT

Technologies are generally described for runtime optimization adjusted dynamically according to changing costs of one or more system resources. Multicore systems may encounter dynamic variations in performance associated with the relative cost of related system resources. Furthermore, multicore systems can experience dramatic variations in resource availability and costs. A dynamic registry of system resource costs can be utilized to guide dynamic optimization. The relative scarcity of each resource can be updated dynamically within the registry of system resource costs. A runtime code generating loader and optimizer may be adapted to adjust optimization according to the resource cost registry. Information regarding system resource costs can support optimization tradeoffs based on resource cost functions.

16 Claims, 5 Drawing Sheets

(56) References Cited

U.S. PATENT DOCUMENTS

| | | | |
|---|---|---|---|
| 7,574,567 B2* | 8/2009 | Wyman | 711/141 |
| 8,078,832 B1* | 12/2011 | Agarwal et al. | 712/13 |
| 8,108,843 B2* | 1/2012 | Nair et al. | 717/139 |
| 8,181,169 B2* | 5/2012 | Nakaike et al. | 717/151 |
| 8,214,817 B2* | 7/2012 | Mendelson et al. | 717/158 |
| 8,443,341 B2* | 5/2013 | Berg et al. | 717/131 |
| 2003/0171907 A1* | 9/2003 | Gal-On et al. | 703/14 |
| 2003/0236919 A1 | 12/2003 | Johnson et al. | |
| 2004/0181730 A1 | 9/2004 | Monfared et al. | |
| 2005/0154861 A1 | 7/2005 | Arimilli et al. | |
| 2005/0210472 A1 | 9/2005 | Accapadi et al. | |
| 2005/0246461 A1 | 11/2005 | Accapadi et al. | |
| 2006/0041599 A1* | 2/2006 | Tsuchida et al. | 707/200 |
| 2006/0259800 A1 | 11/2006 | Maejima | |
| 2007/0027972 A1 | 2/2007 | Agrawal et al. | |
| 2007/0044084 A1* | 2/2007 | Wang et al. | 717/151 |
| 2007/0079308 A1 | 4/2007 | Chiaramonte et al. | |
| 2007/0124457 A1 | 5/2007 | May et al. | |
| 2008/0046895 A1 | 2/2008 | Dillenberger et al. | |
| 2008/0126751 A1 | 5/2008 | Mizrachi et al. | |
| 2008/0178183 A1 | 7/2008 | Accapadi et al. | |
| 2008/0229127 A1 | 9/2008 | Felter et al. | |
| 2009/0031317 A1 | 1/2009 | Gopalan et al. | |
| 2009/0031318 A1 | 1/2009 | Gopalan et al. | |
| 2009/0070553 A1* | 3/2009 | Wallach et al. | 712/34 |
| 2009/0077562 A1 | 3/2009 | Sen et al. | |
| 2009/0125894 A1* | 5/2009 | Nair et al. | 717/156 |
| 2009/0126006 A1 | 5/2009 | Zhang et al. | |
| 2009/0187915 A1 | 7/2009 | Chew et al. | |
| 2010/0017804 A1 | 1/2010 | Gupta et al. | |
| 2010/0122101 A1 | 5/2010 | Naffziger et al. | |
| 2010/0225496 A1 | 9/2010 | Hou et al. | |
| 2011/0004692 A1 | 1/2011 | Occhino et al. | |
| 2011/0088021 A1 | 4/2011 | Kruglick | |
| 2011/0088038 A1 | 4/2011 | Kruglick | |
| 2011/0093733 A1 | 4/2011 | Kruglick | |
| 2011/0302585 A1 | 12/2011 | Dice | |

FOREIGN PATENT DOCUMENTS

| | | |
|---|---|---|
| JP | 2008-085164 | 3/2005 |
| JP | 2006-318380 | 11/2006 |
| JP | 2008-513912 | 5/2008 |

OTHER PUBLICATIONS

Bala, et al., "Dynamo: A Transparent Dynamic Optimization System," Jun. 2000, Proceedings of Programming Language Design and Implementation, 12 pages.

Baraz, et al., "IA_32 Execution Layer: A Two-Phase Dynamic Translator Designed to Support IA-32 Application on Itanium®-based Systems," Dec. 2003, Proceedings of the 36th International Symposium on Microarchitecture, 11 pages.

Dehnert, et al., "The Transmeta Code Morphing™ Software: Using Speculation, Recovery, and Adaptive Retranslation to Address Real-Life Challenges," 2003, ACM International Conference Proceedings Series, vol. 37, Proceedings of the International Symposium on Code Generation and Optimization: Feedback-directed and Runtime Optimization, Abstract, 9 pages.

Ebcioglu, et al., "DAISY: Dynamic Compilation for 100% Architectural Compatibility," 1997, Proceedings of the 24th International Symposium on Computer Architecture, 13 pages.

Microsoft .NET Framework, http://www.microsoft.com/net/, accessed Oct. 13, 2009, 1 page.

International Search Report and Written Opinion dated Feb. 3, 2011 in PCT Application No. PCT/US10/53110.

U.S. Office Action dated Jan. 31, 2012 in U.S. Appl. No. 12/578,321.
U.S. Office Action dated Jul. 5, 2012 in U.S. Appl. No. 12/578,321.
U.S. Office Action dated Jun. 20, 2012 in U.S. Appl. No. 12/578,295.
U.S. Office Action dated Nov. 14, 2011 in U.S. Appl. No. 12/582,301.
U.S. Office Action dated Jun. 28, 2012 in U.S. Appl. No. 12/582,301.

Kang et al., "Preliminary Study toward Intelligent Run-time Resource Management Techniques for Large Multi-Core Architectures," Apr. 15, 2008, University of Southern California—Information Sciences Institute, 2 pages.

Song, et al., "Analytical Modeling and Optimization for Affinity Based Tread Scheduling on Multicore Systems", Jul. 14, 2009, IEEE Cluster 2009, New Orleans, Louisiana, 10 pages.

Song, et al., "Feedback-Directed Thread Scheduling with Memory Considerations," ACM, Jun. 2007, pp. 1-10.

Brooks et al., "Dynamic Thermal Management for High-Performance Microprocessors" Jan. 2001, Proceedings of the 7th International Symposium on High Performance Computer Architecture, 12 pages.

Donald et al., "Techniques for Multicore Thermal Management: Classification and New Exploration". Jun. 2006, Proceedings of the 33rd Annual International Symposium on Computer Architecture, pp. 78-88.

Shirako et al., "Compiler Control Power Saving Scheme for Multi Core Processors" in Lecture Notes in Computer Science: Languages and Compilers for Parallel Computing. vol. 4339/2006. Springer-Verlag, Berlin, pp. 362-376, 2007.

"P6T New Era for Ultimate Performance! Intel® Core ™ i7 Platform," accessed at http://www.asus.com/Motherboards/Intel_Socket_1366/P6T/, accessed on Mar. 5, 2012, pp. 4.

U.S. Office Action dated Nov. 21, 2012 in U.S. Appl. No. 12/578,295.

* cited by examiner

US 8,635,606 B2

DYNAMIC OPTIMIZATION USING A RESOURCE COST REGISTRY

BACKGROUND

Unless otherwise indicated herein, the materials described in this section are not prior art to the claims in this application and are not admitted to be prior art by inclusion in this section.

Compilations performed with dynamic optimization attempt to improve the operation of software or microcode at runtime. Systems leveraging such dynamic optimization may iteratively execute dynamically compiled code in an attempt to identify optimizations for compilation. For example, procedure calls having high demand may be tracked to focus optimization on those procedure calls. Traditional dynamic optimization systems do not perform more complex optimizations that require understanding of the relative value or cost of improvements made during optimization. Furthermore, code may generally be optimized to a conservative level to ensure functionality of the resultant executable code.

Multicore processors are generally made up of multiple processor cores with interconnections between the individual cores. As core counts within multicore processors increase, making effective use of the multiple cores within a system becomes an important operational consideration. Dynamic optimization compilers on such computers may encounter a vast array of additional optimization variables and those variables may change rapidly even during runtime. Dynamic compilers in multicore systems may also encounter a memory wall when core counts scale up faster than memory. As such, memory might be plentiful when few applications are running, but then memory may quickly become a system performance constraint once an increased number of applications are executing.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
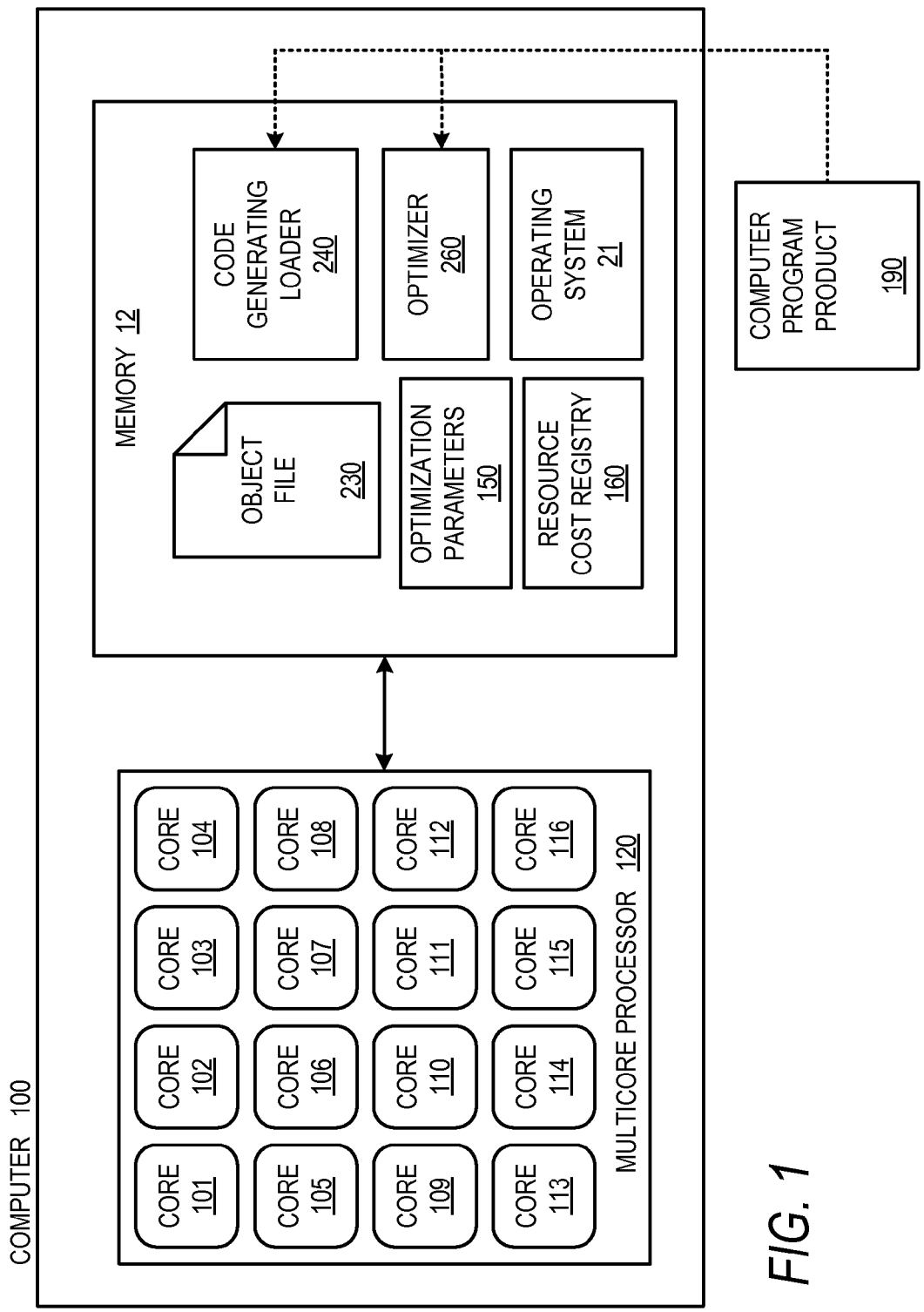
FIG. 1 is a block diagram illustrating a computer having a multicore processor and a memory configured with executable software components for performing dynamic optimization using a resource cost registry.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the present disclosure, as generally described herein, and illustrated in the figures can be arranged, substituted, combined, separated, and designed in a wide variety of different configurations, all of which are explicitly contemplated herein. It should be appreciated that while multicore processor embodiments are discussed throughout this disclosure, various other multiprocessor or parallel computing architectures may be leveraged for the parallel dynamic optimization technologies discussed herein. As such, a processing unit may be a core within one or more multicore processors, a processor within a multiprocessor system, a processor within any other parallel processing architecture, or any combination thereof.

This disclosure is generally drawn to methods, apparatus, systems, and computer program products related to parallel dynamic optimization. Runtime compilation performed by compilers leveraging dynamic optimization (DO) attempt to improve the operation of software or microcode at runtime. Examples of DO systems include CODE MORPHING from TRANSMETA, DAISY from INTERNATIONAL BUSINESS MACHINES CORPORATION, DYNAMO from HEWLETT PACKARD CORPORATION, various JAVA virtual machines, MICROSOFT® .NET from MICROSOFT CORPORATION, and the INTEL® IA32 Execution Layer from INTEL CORPORATION.

According to embodiments presented herein, a runtime compiler and optimizer may be adapted to generate executable code while adjusting dynamically to changing system resource costs. Multicore systems may encounter dramatic dynamic variations in performance associated with thread starts, memory usage, and various other operations depending upon the relative cost of related system resources. Furthermore, multicore systems can experience dramatic variations in resource availability and costs. System status information and resource cost data can be leveraged during dynamic optimization.

The multicore dynamic optimizations disclosed herein can support both more specific and more varied parameters that can be tuned during optimization when compared to traditional dynamic optimization. The optimization parameters discussed herein may also be tuned over a wider range. The wide range of varied optimization parameters along with information regarding system resource costs can support making tradeoffs based on cost functions. A dynamic registry of system resource costs can be provided to guide dynamic optimization. The relative scarcity of each resource can be updated dynamically within the registry of system resource costs so that the dynamic optimization system can guide its compile iterations to accommodate current system conditions. A runtime code generating loader and optimizer can adjust optimization according to the resource cost registry.

The executable code can be generated with variations of optimization parameters based upon resource cost information. Preferred optimization parameters may be determined from the executable code instances that correctly complete in the least time, or use the least amount of memory, or prove superior according to some other fitness metric. Preferred optimization parameters can be used along with resource costs to seed future optimization attempts, while the less desirable optimization parameters may be avoided when setting parameters for future optimization results. Output generated from the code instances using preferred optimization parameters may be used as soon as they correctly complete execution. The generated code may then be executed on any processor or computing machine. For example, a multiprocessor system, such as a multicore processor, can be used to execute the generated code. Parallelism within the multicore processor system may be leveraged to simultaneously execute various code instances to explore varying parameter settings more rapidly.

FIG. 1 is a block diagram that illustrates a computer 100 having a multicore processor 120 and a memory 12 configured with executable software components for performing dynamic optimization using a resource cost registry 160 on multiple cores 101-116 of the multicore processor 120, all arranged according to one or more embodiments presented herein. The computer 100 may employ the multiple cores 101-116 of the multicore processor 120 to perform various computing tasks. memory 12 may be arranged to cooperate with multicore processor 120 to store, retrieve and/or operate on one or more of optimization parameters 150, resource cost registry 160, object file 230, code generating loader 240 and/or optimizer 260. Computer 100 may be adapted for operation by a computer program product 190, where Memory 12 may in some examples be adapted to retrieve one or more of the items stored in memory 12 from computer program product 190.

Example computing tasks performed by computer 100 may include the execution of code such as from object file 230. The object file 230 may be described as a portable intermediate software module. Such a portable intermediate representation may also be referred to as a thin binary, a slim binary, or a partially compiled code module. The object file 230 may contain partially compiled code from which a final generation of executable code can be performed at runtime by code generating loader 240. The code generating loader 240 may be configured to generate instances of the executable code using different optimization parameters 150 based upon system resource costs obtained from the resource cost registry 160. The optimization parameters 150 can specify settings for various compiler optimization options to be used by the code generating loader 240 as discussed in further detail below. Initial settings for the optimization parameters 150 may be established randomly, using weighted functions, or they may be specified. For example, prior knowledge of execution may be stored locally or received along with the object file 230. This information may guide initial settings for the optimization parameters 150.

The resource cost registry 160 may be arranged to store costs associated with resources associated with the computer 100. An example resource may include available processor cores where the cost may be expressed as the current load on each core, the temperature of each core, the operating frequency of each core, the energy required to operate each of the cores, the availability of specific computational resources within each core, the distance of each core from another related core, a related bus, or a related memory, or any other cost of using one or more of the available processor cores. Another example resource may be a memory or a cache memory where the cost may be expressed as availability of the memory, size of the memory, speed of the memory or an associated bus, energy required to use the memory, the state of the cache, or any other costs associated with the memory. Other example resources may include battery power, peripheral access, buses, I/O access, display space, display processing, user interaction metrics, any other resource associated with the computer 100, or any combination thereof. In addition to examples already discussed, costs associated with resources may be expressed as processing time, memory usage, processing delay, communication delay, processing latency, storage latency, communication latency, power or energy consumption, processor heat, system heat, mean time between failure (MTBF) of the resources, impact on other resources, any other characteristic of system resource operation, or any combination thereof.

The executable code instances created by the code generating loader 240 may be executed on the multicore processor 120. The execution of the code instances may be performed in parallel to leverage the multiple cores 101-116 of the multicore processor 120. An executable code instance having the fastest, or more efficient, correct completion may be considered to have been generated using a preferred set of optimization parameters 150. Such a code instance may be referred to herein as a preferred instance.

Results from executing one of the code instances may be provided to the user or calling function as soon as the associated code instance generates the results. For example, the code instance using the preferred optimization parameters may complete faster than other code instances and thus provide the results first. These first results may be used as the official results of executing the code. Other instances of executable code, still executing, may be terminated or observed by the optimizer 260 once the preferred instance is determined to complete correctly by the optimizer 260.

The optimizer 260 may be adapted to identify one or more preferred instances of executable code. The optimization parameters 150 associated with the preferred instances of executable code may be referred to as preferred optimization parameters. The optimizer 260 may be adapted to communicate optimization parameters 150 to the code generating loader 240 such that code generating loader 240 is informed of the optimization parameters 150 that are identified with preferred instances of executable code.

As described previously, the memory 12 may be coupled to the multicore processor 120 to support the techniques discussed herein. For example, the memory 12 may be configured to store one or more of the object file 230, the code generating loader 240, the optimization parameters 150, the resource cost registry, and/or the optimizer 260. The code generating loader 240 and the optimizer 260 can be executed by computer 100 in association with the multicore processor 120 to apply dynamic optimization techniques using resource cost registry 160 for execution of object file 230. The dynamic optimization can leverage the multiple cores 101-116 of the multicore processor 120 to optimize the runtime compilation of the object file 230. It should also be appreciated that the techniques discussed herein may be implemented as hardware modules within, or associated with, the multicore processor 120. The modules may also be combinations of hardware and software according to various embodiments. For example, functionality of the code generating loader 240 and the optimizer 260 may be performed by one or more hardware modules. Additional details regarding the computer 100, including the operation of the memory 12, are further detailed with respect to FIG. 4.

Figure 2:
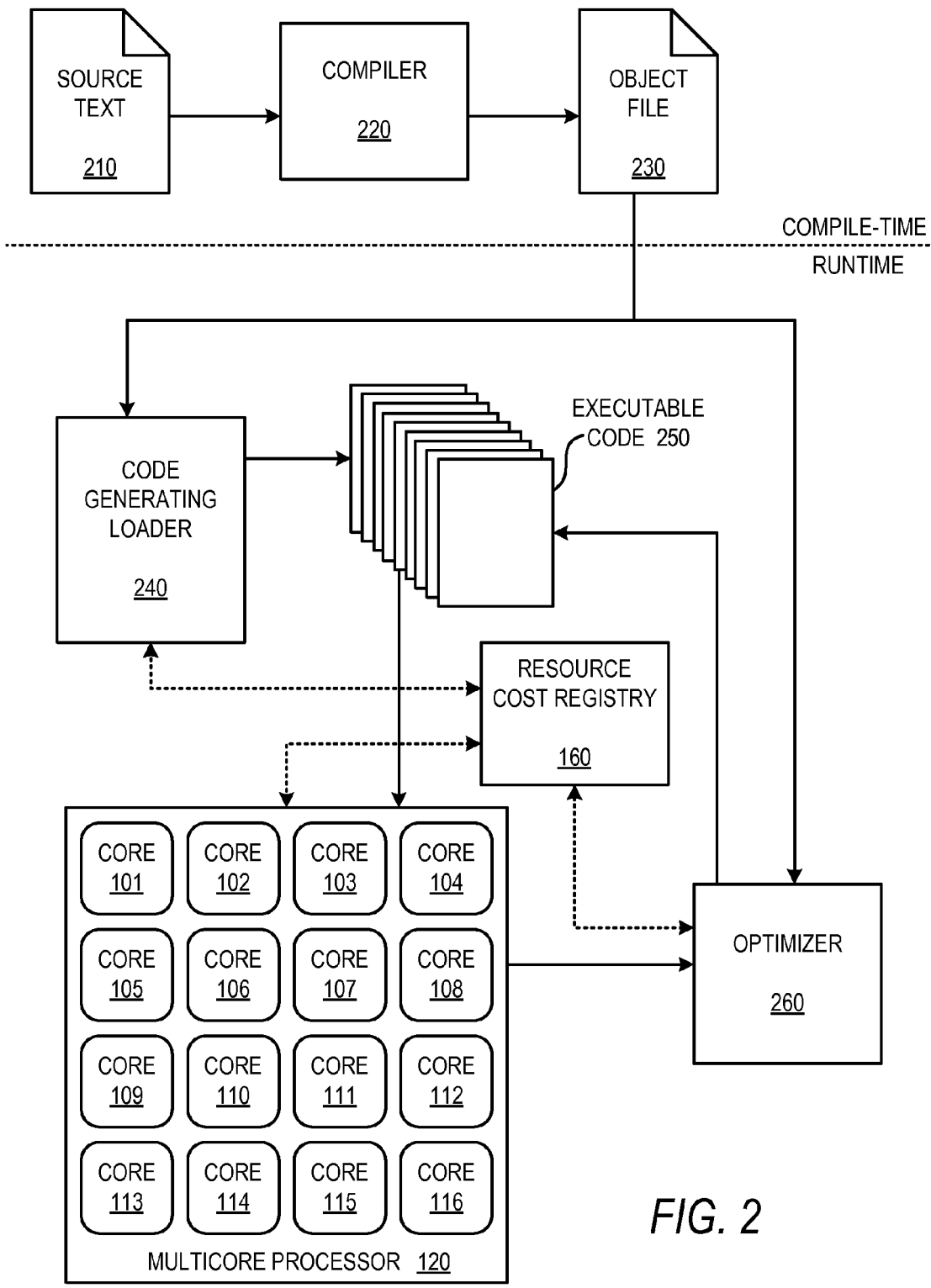
FIG. 2 is a block diagram illustrating dynamic optimization using a resource cost registry during the runtime execution of executable code.

Turning now to FIG. 2, a block diagram illustrates dynamic optimization using a resource cost registry 160 during the runtime execution of executable code 250, arranged according to one or more embodiments presented herein. At compile time, the compiler 220 can compile source code from a source text 210 into an object file 230. The object file 230 may be described as a portable intermediate software module. The object file 230 may be distributed to various types of computing machines, such as the computer 100, where compilation of the object file 230 may be completed locally. Local completion of the compilation may be performed at runtime. According to various embodiments, the object file 230 may run locally on the computer 100 in association with a virtual machine, a media player, a runtime player, a plug-in player, a runtime compiler, or a just-in-time (JIT) compiler.

In association with the computer 100, the object file 230 may be further converted into executable code 250 by a code generating loader 240. Multiple instances of the executable code 250 may be generated by the code generating loader 240. The executable code 250 can be generated while varying the optimization parameters 150 used by the code generating loader 240. The optimization parameters 150 to be optimized, and the optimization ranges of these parameters, may be dependent upon characteristics of the computer 100 such as the cost of resources within the computer as provided by the resource cost registry 160. According to various embodiments, parameters that may be optimized can include executing threads or processes onto other cores, memory block sizes, memory usage, cache sizes, cache access protocols, disk access protocols, levels of loop unrolling, and balance of recalculation versus storage or look-up tables.

During runtime execution, the cost of various system resources may vary rapidly. For example, memory may be consumed and freed over time, processor cores may be loaded or become idle, bus traffic may vary, cache efficiency may ebb and flow, and any other system resource cost, delay, or availability may vary in time. Resource costs to be stored in the resource cost registry 160 may be provided by an operating system, drivers, supervisory processes, the BIOS, other firmware, applications, other software, hardware modules, any other component or modules associated with the computer 100, or any combination thereof. For example, a portion of an operating system 21, such as a scheduler, that tracks processor and core loading, may update such information dynamically to the resource cost registry 160. As another example, a buffer manager (not shown) associated with a network interface driver or network protocol stack may update network resource costs to the resource cost registry 160. As yet another example, a memory manager (not shown) may dynamically provide memory availability information to the resource cost registry 160. The resource cost registry 160 may be dynamically updated to provide the relative cost of system resources used to execute the executable code 250. For example, the relative processing cost of initiating execution of a new thread may vary dynamically. When core usage is low there might be almost no system cost associated with initiating execution of additional threads, but when most, or all, of the cores are busy, the system cost of forking to a new thread may increase and associated performance returns may decrease.

The code generating loader 240 can be arranged to generate one or more instances of the executable code 250 where each instance may be generated using different optimization parameters 150. The optimization parameters 150 may be set, in part, based upon information from the resource cost registry 160. The various code instances may be executed on the cores 101-116 of the multicore processor 120. The optimizer 260 may be associated with execution of the generated code for identifying preferred instances of executable code 250. From the preferred instances, the optimizer 260 may determine desirable values for the optimization parameters 150. The optimizer 260 may use the optimization parameters 150 associated with a preferred instance of executable code 250 along with the dynamically updated information in the resource code registry 160 to inform further operation of the code generating loader 240.

The optimization parameters 150 can be optimized within a multicore system by initiating execution of multiple instances of executable code 250 having different parameter variations on different cores 101-116. The underperforming instances may be terminated and the preferred performers may be allowed to continue. The optimization can be iterated by branching out from the preferred solutions or by generating new parameter mixes to test on other cores 101-116 as they become available.

The methodologies presented herein for dynamic optimization on multicore processors can support riskier optimization strategies for some instances of the parallel executions. Even where uncertain performance effects may result, the parallel nature of the executions can tolerate failure of some of the executing instances. Thus, more aggressive optimization may be attempted in contrast to traditional systems that generally optimize around a set of optimization parameters 150 least likely to fail even when performance may be reduced.

The methodologies presented herein for dynamic optimization using a resource cost registry 160 can also support optimization that generally cannot be done prospectively by altering parameters. For example, memory block size or stack priority optimizations may be difficult to optimize prior to code execution. In an empirical example, a particular mathematical program is optimized around some unpredictable optimization parameters related to modifying memory access block sizes. This type of optimization parameter 150 is one example that traditional dynamic optimization systems cannot optimize because the relationship between the parameter and performance is unpredictable. The resulting performance may vary dramatically and there may be no clear monotonic trend to the performance as a function of the optimization parameters 150. Such unpredictable optimizations can be very difficult for optimization. However, the dynamic optimization presented herein can support a rapid identification of increasingly optimal parameters by the code generating loader 240 and the optimizer 260 particularly where the preferred optimization parameter values may vary with system resource costs.

The resource cost based dynamic optimization techniques discussed herein may be applied to software systems commonly in use. Runtime compiled and optimized systems such as JAVA from SUN MICROSYSTEMS and the MICROSOFT® .NET runtime from MICROSOFT CORPORATION are increasingly common where a web browser becomes increasingly involved in application execution. The resource cost registry techniques for code optimization presented herein may also be applied to dynamic optimization systems utilized in cloud computing applications.

According to some embodiments, an application resource registry may be provided for an application. The application resource registry may suggest to the computing system or associated operating system which system resources may impact application performance. The developer of the application, or a compiler used by the developer, may use the application resource registry to suggest resource cost based optimizations to the final runtime system. For example, the application resource registry may indicate to the runtime system that the application may benefit from being allocated additional memory and/or additional processor cores. The code generating loader 240 and the optimizer 260 associated with the runtime system may use these resource preferences of the application to intelligently adjust any of the optimization parameters 150 affecting the use of system resources by execution of the application. The application resource registry may also indicate preferences for macro level behavior of the application. For example, a specification for "delay when run at startup" might be used with an auto-updating task or application to free resources at boot time. These freed resources may support a faster boot experience for the user.

The runtime system for executing the object file 230 may comprise the code generating loader 240 and the optimizer 260. These modules may execute at the level of applications or operating systems associated with the multicore processor 120. The code generating loader 240 and the optimizer 260 may also be associated with the firmware or basic input/output system (BIOS) of the associated computing system. According to other embodiments, the optimizer 260 may be provided within the multicore processor 120 or by one or more hardware modules or circuits of the associated computing system.

Figure 3:
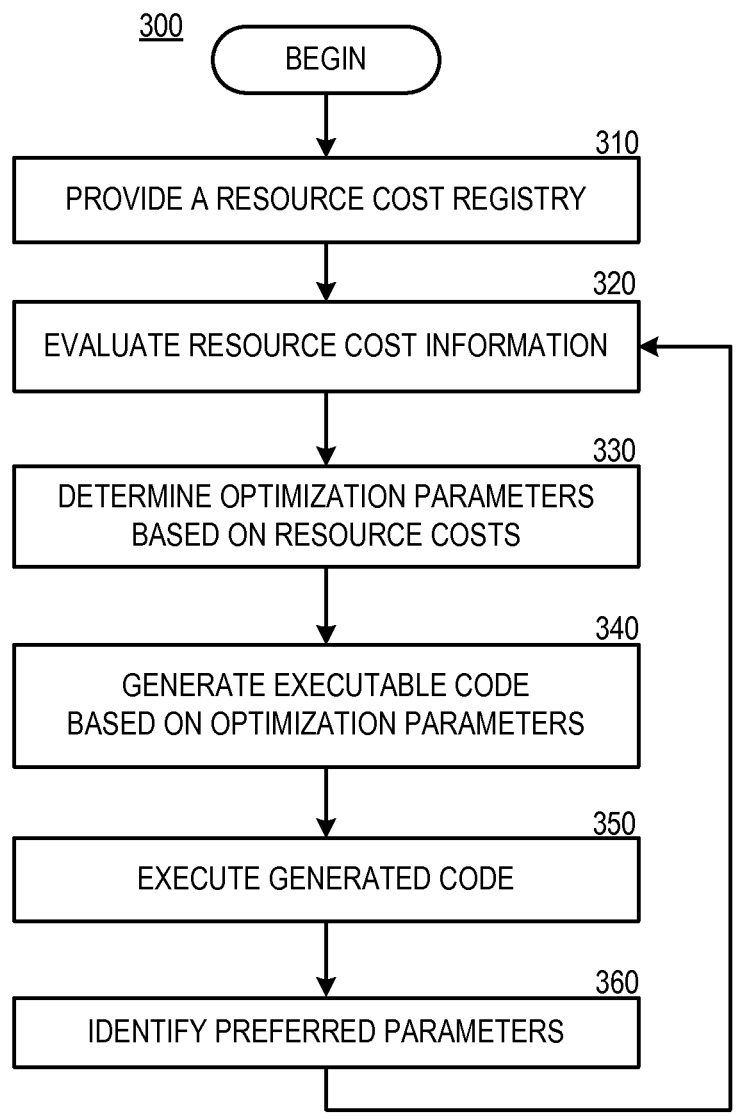
FIG. 3 is a flow diagram illustrating a process for dynamic optimization using a resource cost registry.

Referring now to FIG. 3, additional details will be provided regarding the embodiments presented herein for dynamic optimization using a resource cost registry 160. In particular, FIG. 3 is a flow diagram illustrating a process 300 for dynamic optimizations using a resource cost registry 160, arranged according to at least some embodiments presented herein.

It should be appreciated that the operations described herein are implemented as a sequence of operational or manufacturing acts, as a sequence of computer implemented acts or program modules running on a computing system, or as interconnected machine logic circuits or circuit modules within the computing system. The implementation is a matter of choice dependent on the performance and other requirements of the various embodiments. Some of the logical operations described herein are referred to variously as state operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed sequentially, in parallel, or in a different order than those described herein.

Process 300 may include various operations, functions or actions as illustrated by one or more of blocks 310, 320, 330, 340, 350, and/or 360. The process 300 may begin at block 310 (Provide a Resource Cost Registry), where a resource cost registry 160 may be provided on the computer 100. As discussed above, the resource cost registry 160 may be organized to store costs associated with resources of the computer 100. The costs may be expressed as processing time, memory usage, processing delay, communication delay, access latency, risk, energy, heat, impact on other resources, any other characteristic of system resource operation, or any combination thereof. The resources may include processor cores, proximity of processor cores, memory, caches, energy, power, heat, time, delay, peripheral access, buses, I/O access, display space, display processing, user interaction metrics, any other resource associated with the computer 100, or any combination thereof. Block 310 may be followed by block 320.

At block 320 (Evaluate Resource Cost Information), resource cost information may be collected into the resource cost registry 160 and retrieved by the code generating loader 240 for evaluation. Resource costs to be stored may be provided by an operating system, drivers, supervisory processes, the BIOS, other firmware, applications, other software, hardware modules, any other component or modules associated with the computer 100, or any combination thereof. Block 320 may be followed by block 330.

At block 330 (Determine Optimization Parameters Based on Resource Costs), optimization parameters 150 may be set or adjusted by the code generating loader 240 in response to the cost of system resources. The optimization parameters 150 may be used while dynamically optimizing the execution of the received object file 230. The cost of system resources may be obtained by the code generating loader 240 from the resource cost registry 160. Optimizations may be shifted from a first resource to a second resource as a cost associated with the second resource decreases relative to a cost of the first resource. For example, if processor cores become loaded thus increasing the cost of computation power while memory becomes free thereby decreasing the cost of memory, then optimization by the code generating loader 240 may shift to favor space consumption over the consumption of computational time. Block 330 may be followed by block 340.

As discussed above, examples of optimization parameters 150 may include memory block size, cache size, cache access protocols, memory access protocols, cache update policies, repeated computation versus look-up tables, loop unrolling, and various other computational optimization techniques known in the art. For each of the optimization parameters 150, a range of optimization may be established. A starting point within each range may also be specified for beginning the optimization. An appropriate metric of performance or fitness may also be selected for measuring the effectiveness of variations in the selected optimization parameters 150.

At block 340 (Generate Executable Code Based on Optimization Parameters), the code generating loader 240 can generate one or more instances of executable code 250 based on the object file 230 and the optimization parameters 150 determined at operation 330. Each instance of the generated code may be selected to test different combinations of the optimization parameters 150. Some embodiments may focus on optimization parameters 150 being varied around the initial suggested values for the optimization parameters 150. Various other embodiments may be adapted to select initial optimization parameters randomly, using weighted functions, or using prior knowledge of execution according to a type of program or according to the source of a program. These and other approaches for initializing the optimization parameters 150 may be applied within the spirit and scope of the technology discussed herein. Block 340 may be followed by block 350.

At block 350 (Execute Generated Code), the one or more instances of executable code 250 generated at operation 340 may be executed on the multicore processor 120. The one or more instances of executable code 250 may be executed in parallel on the multicore processor 120. The optimizer 260 can be arranged to profile the execution of the executable code 250 to determine which of the instances of executable code 250 are the most optimized for execution on the multicore processor 120 given the current cost of system resources. Block 350 may be followed by block 360.

At block 360 (Identify Preferred Parameters), the optimizer 260 may be arranged to identify instances of executable code 250 most optimized for execution on the multicore processor 120 given the current cost of system resources as preferred instances. The optimization parameters 150 associated with preferred instances may be identified by the optimizer 260 as preferred parameters. As mentioned above, the preferred parameters may be the parameters associated with the first successful completing instances of the executable code 250. According to other embodiments, the preferred parameters may be the parameters associated with the instances of the executable code 250 that attempt to maximize, to minimize, or to best balance various other fitness metrics as discussed herein. The fitness metrics may be related to the cost of system resources as provided by the resource cost registry 160.

The optimizer 260 may also be arranged to identify less desirable settings for the optimization parameters 150. The less desirable parameters may be associated with instances of executable code 250 that do not complete or instances of the executable code 250 that complete in a longer period of time or using more resources than those associated with the preferred parameters in operation 360. The resulting optimization parameters may be used to inform future compilation and execution of the object file 230. The resulting optimization parameters 150 may also be used to inform refinement of the optimization by seeding the generation of another round of instances of the executable code 250 as discussed with respect to operation 340. After block 360, the process 300 may either repeat (e.g., periodically, continuously, or on demand as needed) by looping back to block 320, or the process 300 may terminate.

Figure 4:
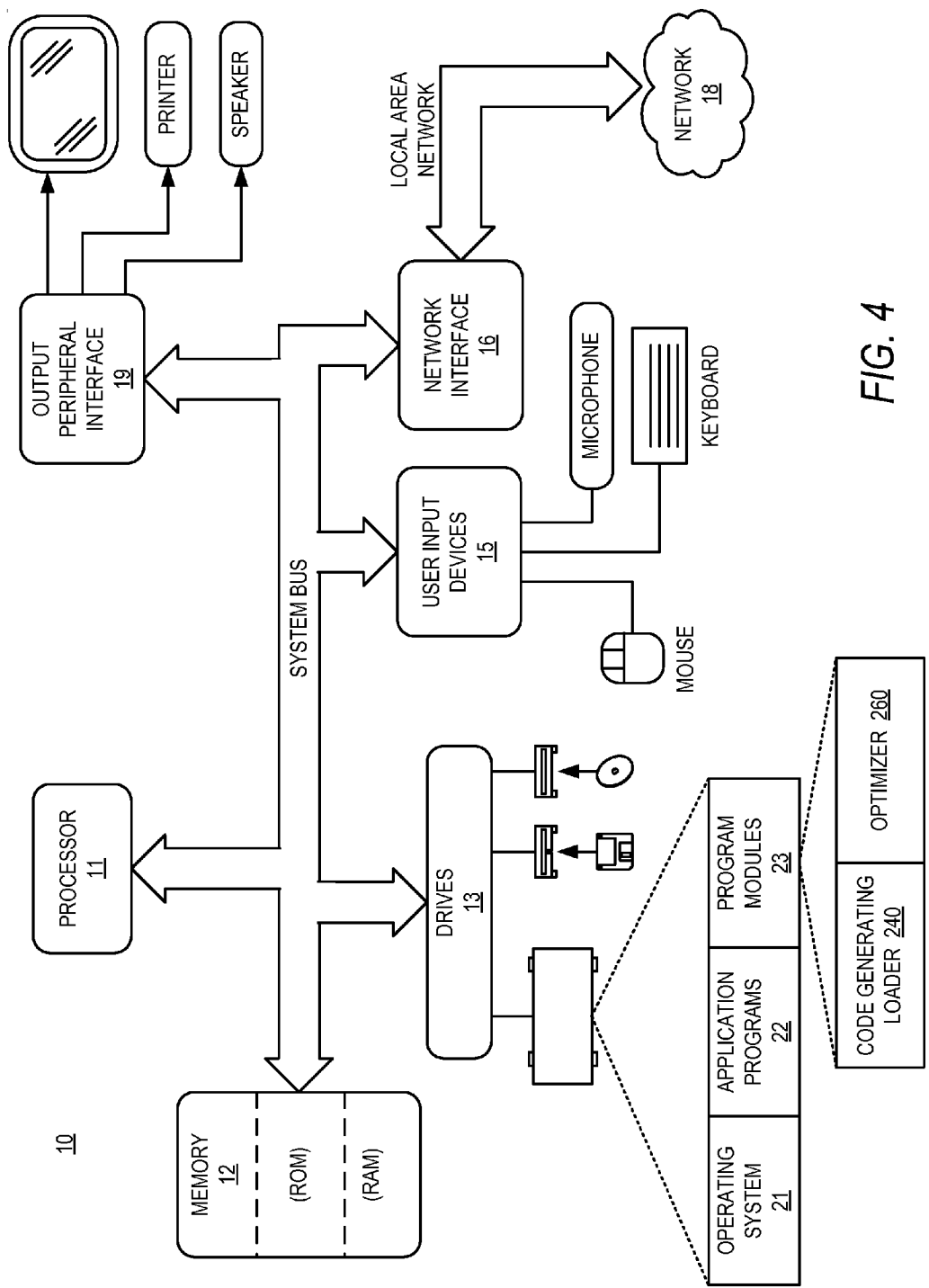
FIG. 4 is a block diagram illustrating an example computing system.

With reference to FIG. 4, an example computing system for implementing various embodiments presented herein will be discussed. The computing system can support embodiments for implementing dynamic optimization using a resource cost registry 160 in association with one or more multicore processors 120. For example, the computing system can comprise program modules 23 such as the code generating loader 240 and the optimizer 260. Various embodiments may include computers, dedicated hardware, or embedded computing systems.

The computing system includes a computer 10. According to various embodiments, the computer 10 may be the computer 100 discussed with respect to FIG. 1. The computer 10 can include a processor 11, a memory 12 and one or more drives 13. The drives 13 and their associated computer storage media can provide storage of computer readable instructions, data structures, program modules 23 and other data for the computer 10. The computer 10 may be implemented as a conventional computer system, an embedded control computer, a laptop, or a server computer, a mobile device, a set-top box, a kiosk, a vehicular information system, a mobile telephone, a customized machine, or other hardware platform. The processor 11 may be a general purpose processor, a processor core, a multiprocessor, a multicore processor 120, a graphics processor, a digital signal processing (DSP) processor, a customized computing device implemented within an application specific integrated circuit (ASIC), a customized computing device implemented within a field programmable gate array (FPGA), a customized computing device implemented within any type of programmable logic, a state machine, a reconfigurable processor, any other processing unit, or any combination or multiplicity thereof. The processor 11 may support dynamic optimization leveraging a resource cost registry 160 and multicore processors as discussed herein.

The drives 13, other storage devices, or their associated computer-readable storage media can store an operating system 21, application programs 22, and program modules 23. The computer 10 can include user input devices 15 through which a user may enter commands and data. Input devices can include an electronic digitizer, a microphone, a keyboard, a pointing device, or any combination thereof. Examples of pointing devices may include a mouse, trackball, light pen, touch screen, or touch pad. Other input devices to the computer 10 may include a joystick, game pad, satellite dish, scanner, or the like. Input devices can be connected to processor 11 through a user input interface that is coupled to a system bus. The input devices may also be connected by other interface and bus structures, such as a parallel port, game port or a universal serial bus (USB). Computers such as computer 10 may also include other peripheral output devices such as speakers, which may be connected through an output peripheral interface 19 or similar interface.

The computer 10 may operate in a networked environment using logical connections to one or more computers, such as a remote computer connected to network interface 16. The remote computer may be a personal computer, a server, a router, a network PC, a peer device, or other common network node. The remote computer can include many or all of the elements described herein relative to the computer 10. Networking environments may include networks (WAN), local area networks (LAN), intranets, the Internet, or combinations thereof.

When used in a LAN or wireless LAN (WLAN) networking environment, the computer 10 may be connected to the LAN through a network interface 16 or a network adapter. When used in a WAN networking environment, the computer 10 can include a modem or other mechanism for establishing communications over the WAN. The WAN may include the Internet, the illustrated network 18, various other networks, or any combination thereof. It should be appreciated that other mechanisms of establishing a communications link, ring, mesh, bus, cloud, or network between computers may be used.

According to one or more embodiments, computer 10 may be configured such that the processor 11 and/or program modules 23 can perform dynamic optimization leveraging the resource cost registry 160 and multicore processors 120 in accordance with various embodiments presented herein. The computer 10 may include one or more instances of a physical computer-readable storage medium or media associated with drives 13 or other storage devices. The system bus may enable the processor 11 to read code and/or data to/from the computer-readable storage media. The media may represent an apparatus in the form of storage elements that are implemented using any suitable technology, including but not limited to semiconductors, magnetic materials, optical media, electrical storage, electrochemical storage, or any other such storage technology. The media may represent components associated with memory 12, whether characterized as RAM, ROM, flash, or other types of volatile or nonvolatile memory technology. The media may also represent secondary storage, whether implemented as the storage drives 13 or otherwise. Hard drive implementations may be characterized as solid state, or may include rotating media storing magnetically-encoded information.

The storage media may include one or more program modules 23 such as the code generating loader 240 and the optimizer 260 for performing resource cost based dynamic optimization. The program modules 23, or other modules within the operating system 21 or within the application programs 22 may include software instructions that, when loaded into the processor 11 and executed, transform a general-purpose computing system into a special-purpose computing system customized to facilitate all, or part of, the dynamic optimization techniques disclosed herein. As detailed throughout this description, the program modules 23 may provide various tools or techniques by which the computer 10 may participate within the overall systems or operating environments using the components, logic flows, and/or data structures discussed herein.

The processor 11 may be constructed from any number of transistors or other circuit elements, which may individually or collectively assume any number of states. More specifically, the processor 11 may operate as a state machine or finite-state machine. Such a machine may be transformed to a second machine, or specific machine by loading executable instructions contained within the program modules 23. These computer-executable instructions may transform the processor 11 by specifying how the processor 11 transitions between states, thereby transforming the transistors or other circuit elements constituting the processor 11 from a first machine to a second machine, wherein the second machine may be specifically configured to support dynamic optimization leveraging the resource cost registry 160. The states of either machine may also be transformed by receiving input from one or more user input devices 15, network interfaces 16, other peripherals, other interfaces, or one or more users or other actors. Either machine may also transform states, or various physical characteristics of various output devices such as printers, speakers, video displays, or otherwise.

Encoding the program modules 23 may also transform the physical structure of the storage media. The specific transformation of physical structure may depend on various factors, in different implementations of this description. Examples of such factors may include, but are not limited to: the technology used to implement the storage media, whether the storage media are characterized as primary or secondary storage, and the like. For example, if the storage media are implemented as semiconductor-based memory, the program modules 23 may transform the physical state of the semiconductor memory 12 when the software is encoded therein. For example, the software may transform the state of transistors, capacitors, or other discrete circuit elements constituting the semiconductor memory 12.

As another example, the storage media may be implemented using magnetic or optical technology such as drives 13. In such implementations, the program modules 23 may transform the physical state of magnetic or optical media, when the software is encoded therein. These transformations may include altering the magnetic characteristics of particular locations within given magnetic media. These transformations may also include altering the physical features or characteristics of particular locations within given optical media, to change the optical characteristics of those locations. It should be appreciated that various other transformations of physical media are possible without departing from the scope and spirit of the present description.

Figure 5:
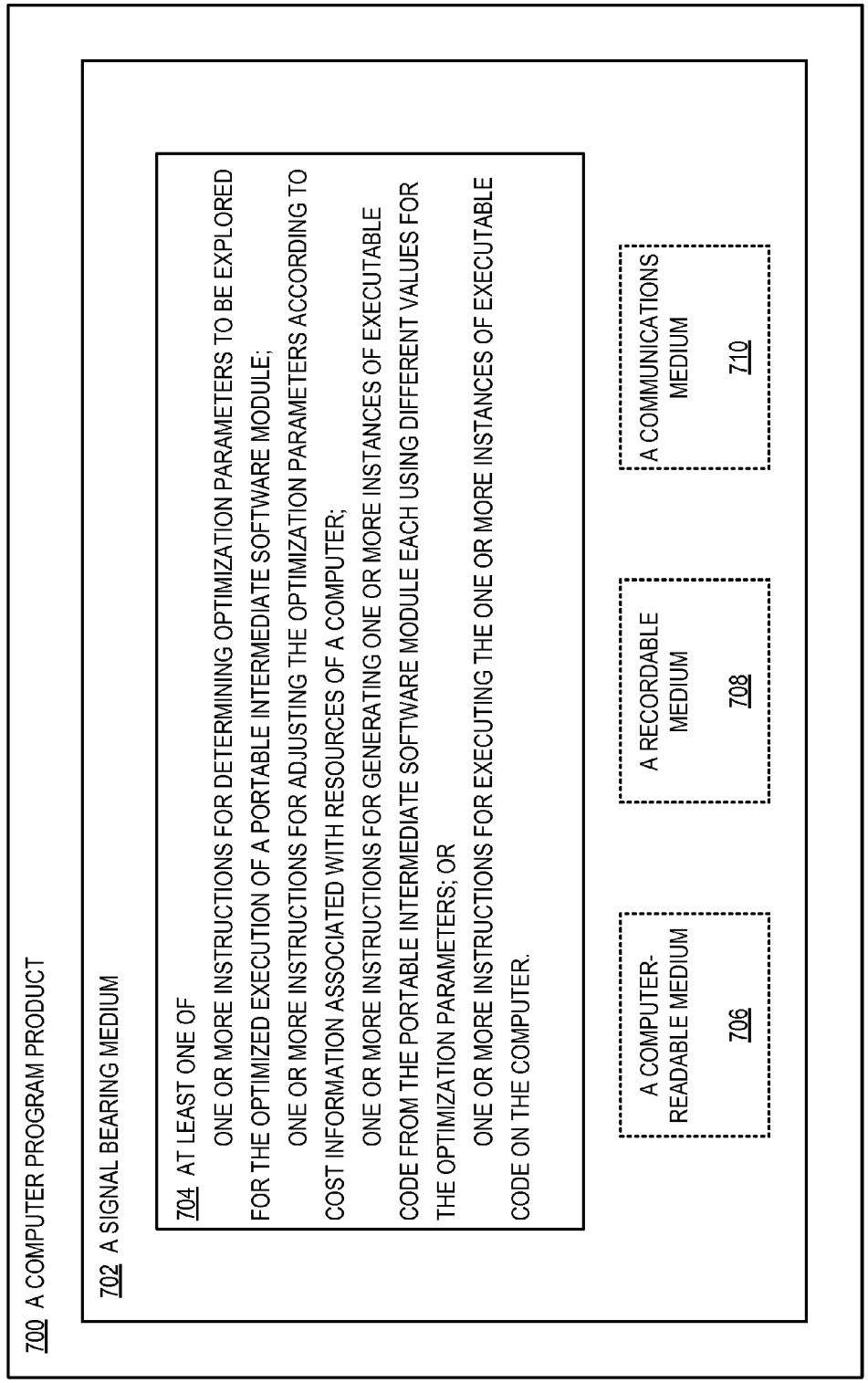
FIG. 5 is a schematic illustrating a partial view of a computer program product that includes a computer program for executing a computer process on a computing device, all arranged according to at least some embodiments presented herein.

Turning now to FIG. 5, a schematic illustrates a partial view of a computer program product 700 that includes a computer program for executing a computer process on a computing device, arranged according to at least some embodiments presented herein. An illustrative embodiment of the example computer program product is provided using a signal bearing medium 702, and may include at least one instruction of 704: one or more instructions for determining optimization parameters to be explored for the optimized execution of a portable intermediate software module; one or more instructions for adjusting the optimization parameters according to cost information associated with resources of a computer; one or more instructions for generating one or more instances of executable code from the portable intermediate software module each using different values for the optimization parameters; or one or more instructions for executing the one or more instances of executable code on the computer. The one or more instructions may be, for example, computer executable and/or logic implemented instructions. In some embodiments, the signal bearing medium 702 of the one or more computer program products 700 include a computer readable medium 706, a recordable medium 708, and/or a communications medium 710.

In some implementations, signal bearing medium 702 may encompass a computer-readable medium 706, such as, but not limited to, a hard disk drive, a Compact Disc (CD), a Digital Video Disk (DVD), a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, computer program product 700 may be conveyed to one or more modules of the described systems by an RF signal bearing medium 702, where the signal bearing medium 702 is conveyed by a wireless form of communications medium 710 (e.g., a wireless communications medium conforming with the IEEE 802.11 standard).

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, components, elements, apparatuses, or systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

In instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

While various aspects and examples have been disclosed herein, other aspects and examples will be apparent to those skilled in the art. The various aspects and examples disclosed herein are for purposes of illustration and are not intended to be limiting, with the true scope and spirit being indicated by the following claims.

What is claimed is:

1. A computer-implemented method for dynamic optimization of a portable intermediate software module on a multicore processor computing system, the method comprising:
   evaluating cost information associated with resources of the computing system;
   determining a set of optimization parameters to be explored for optimized execution of the portable intermediate software module;
   adjusting the set of optimization parameters based upon the cost information to generate a first set of adjusted optimization parameters;
   generating a first instance of executable code from the portable intermediate software module using the first set of adjusted optimization parameters;
   adjusting the set of optimization parameters to generate a second set of adjusted optimization parameters that are different from the first set of adjusted optimization parameters;
   generating a second instance of executable code from the portable intermediate software module using the second set of adjusted optimization parameters;
   executing substantially in parallel on the multicore processor computing system
      the first instance of executable code executing on a first processor core of the multicore processor, and
      the second instance of executable code executing on a second processor core of the multicore processor; and
   identifying a preferred instance of executable code executing on one of the first processor core and the second processor core of the multicore processor based on a comparison of fitness metrics evaluated for the first instance of executable code executing on the first processor core of the multicore processor and evaluated for the second instance of executable code executing on the second processor core of the multicore processor.

2. The computer-implemented method of claim 1, wherein the optimization parameters comprise a tradeoff between memory utilization of the executable code executing on a processor core of the multicore processor and computation time on a processor core of the multicore processor of the computing system.

3. The computer-implemented method of claim 1, wherein the fitness metrics comprise metrics comprise execution times on the first and second processor cores of the multicore processor respectively associated with the first instance of executable code and the second instance of executable code.

4. The computer-implemented method of claim 1, wherein the cost information comprises a measure of processor core availability of the multicore processor of the computing system.

5. The computer-implemented method of claim 1, wherein the cost information comprises a measure of memory availability of the executable code executing on a processor core of the multicore processor of the computing system.

6. A non-transitory computer readable storage medium having computer-executable instructions stored thereon which, when executed by a multicore processor computer cause the multicore processor computer to perform dynamic optimization of a portable intermediate software module by:
   determining optimization parameters to be explored for the optimized execution of the portable intermediate software module;
   adjusting the optimization parameters according to cost information associated with resources of the multicore processor computer;
   sequentially generating two or more instances of executable code from the portable intermediate software module, each of the sequentially generated two or more instances of executable code using different values for the optimization parameters;
   executing substantially in parallel the two or more instances of executable code executing on different processor cores of the multicore processor of the computer; and
   identifying a preferred instance of executable code executing on a respective processor core of the multicore processor based upon a comparison of fitness metrics evaluated for each of the sequentially generated two or more instances of executable code executing substantially in parallel on the respective processor cores of the multicore processor.

7. The non-transitory computer readable storage medium of claim 6, wherein the computer-executable instructions stored, when executed by the multicore processor computer, cause the multicore processor computer to perform the dynamic optimization further by profiling the execution of the sequentially generated two or more instances of executable code to provide the fitness metrics, each fitness metric associated with a respective one of the sequentially generated two or more instances of executable code.

8. The non-transitory computer readable storage medium of claim 7, wherein the computer-executable instructions stored, when executed by the multicore processor computer, cause the multicore processor computer to perform the dynamic optimization further by sequentially generating additional instances of executable code each using different values for the optimization parameters varied from optimization parameters associated with the preferred instance of executable code executing on the respective processor core of the multicore processor.

9. The non-transitory computer readable storage medium of claim 7, wherein the fitness metric being
one of a measure of an execution time on a processor core of the multicore processor,
memory usage of the executable code executing on a processor core of the multicore processor, or
energy resources consumed during an execution time by the respective execution of the two or more instances of executable code executing on a processor core of the multicore processor.

10. The non-transitory computer readable storage medium of claim 6, wherein the cost information comprises an availability metric associated with two or more processor cores of the multicore processor computer.

11. A computing system comprising:
a multicore processing unit having a plurality of cores;
a memory; and
a runtime module stored in the memory and configured to
receive a portable intermediate software module,
establish optimization settings based upon costs associated with resources of the computing system,
sequentially generate two or more instances of executable code from the portable intermediate software module using different values for the optimization settings for each of the sequentially generated instances of executable code,
execute substantially in parallel each of the sequentially generated two or more instances of executable code executing on different ones of the plurality of cores of the multicore processing unit, and
identify a preferred instance of the sequentially generated two or more instances of executable code executing on respective cores of the multicore processing unit based on fitness metrics evaluated for each of the sequentially generated two or more instances of executable code executing on the different ones of the plurality of cores of the multicore processing unit.

12. The computing system of claim 11, wherein the runtime module is further configured to iterate the sequential generation of the instance of executable code using optimization settings varied from the optimization settings associated with the preferred instance of executable code.

13. The computing system of claim 11, wherein the costs associated with resources of the computing system comprises a measure of core availability within the multicore processing unit.

14. The computing system of claim 11, wherein the costs associated with resources of the computing system comprises a measure of availability of the memory.

15. The computing system of claim 11, wherein values for the optimization settings are initially varied from a default set of values.

16. The computing system of claim 15, wherein the default set of values are received along with the portable intermediate software module.

* * * * *

UNITED STATES PATENT AND TRADEMARK OFFICE
CERTIFICATE OF CORRECTION

PATENT NO.         : 8,635,606 B2                                            Page 1 of 1
APPLICATION NO.    : 12/578336
DATED              : January 21, 2014
INVENTOR(S)        : Kruglick It is certified that error appears in the above-identified patent and that said Letters Patent is hereby corrected as shown below:

In the Specification

In Column 3, Line 18, delete "tasks. memory" and insert -- tasks. Memory --, therefor.

In the Claims

In Column 14, Line 32, in Claim 3, delete "metrics comprise metrics comprise" and insert -- metrics comprise --, therefor.

Signed and Sealed this
Thirteenth Day of May, 2014

Michelle K. Lee
*Deputy Director of the United States Patent and Trademark Office*